UNITED STATES PATENT OFFICE.

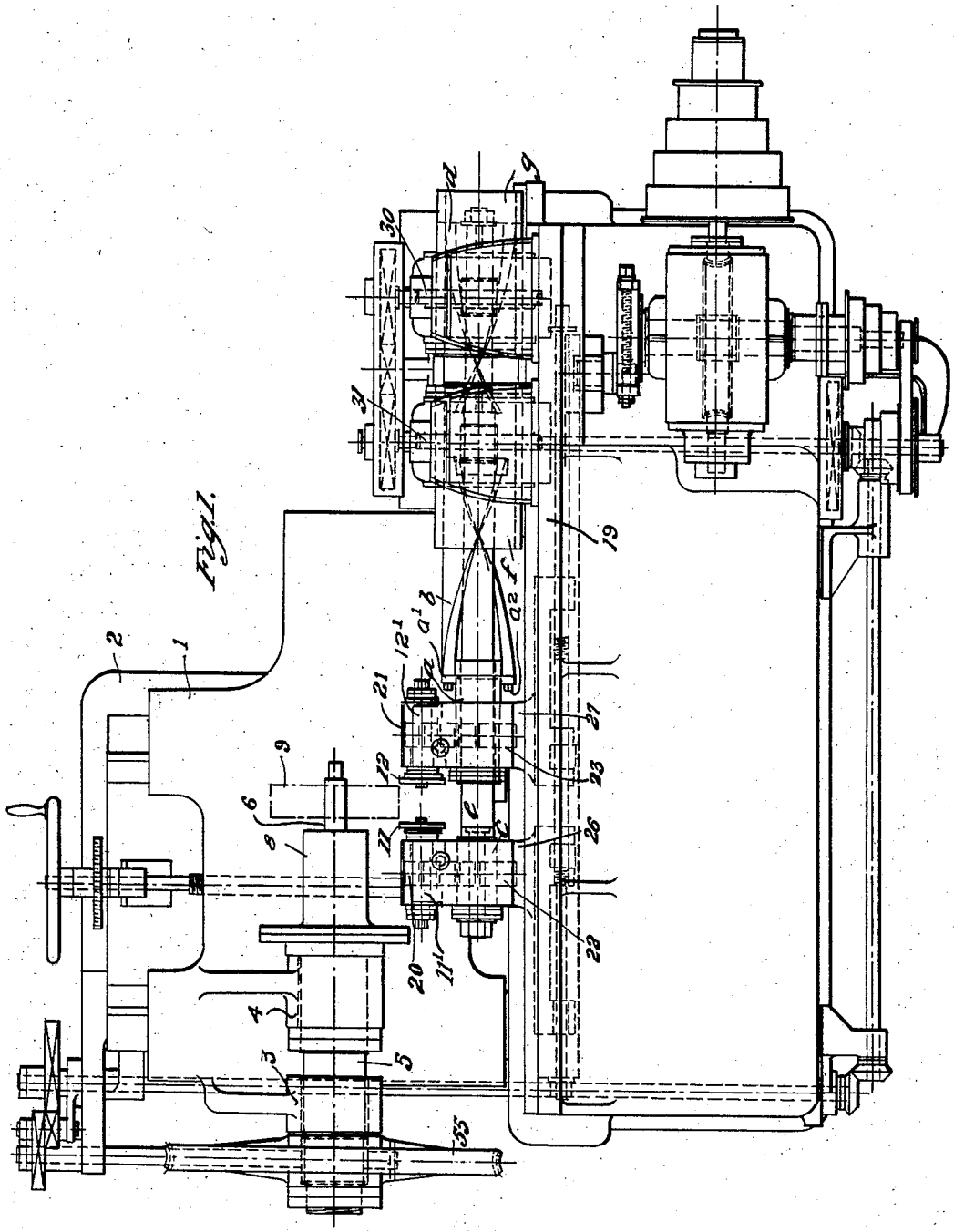

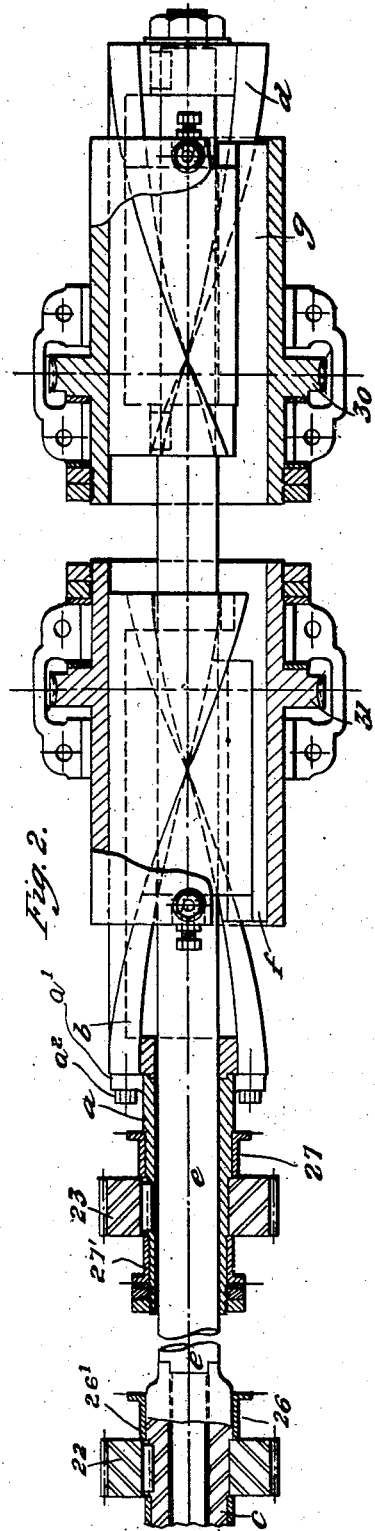

WILLIAM EDWIN SYKES, OF SLOUGH, ENGLAND.

MACHINE FOR CUTTING DOUBLE HELICAL TEETH IN GEAR-WHEELS.

1,323,120. Specification of Letters Patent. Patented Nov. 25, 1919.

Application filed April 30, 1918. Serial No. 231,669.

*To all whom it may concern:*

Be it known that I, WILLIAM EDWIN SYKES, a subject of the King of Great Britain, residing in Slough, England, have invented certain new and useful Improvements in Machines for Cutting Double Helical Teeth in Gear-Wheels, of which the following is a specification.

This invention relates to machines for cutting double helical gear wheels by means of cutters of pinion formation and is an improvement on the apparatus as shown in my prior U. S. Patents Nos. 1,103,851 and 1,188,219, and its object is to provide means for more accurately controlling the indexing and helical motions of the cutters while at the same time permitting the machine to which it is applied to deal with the same range or a larger range of work.

In the apparatus of the two prior specifications referred to I provide two cutter index wheels, one on either side of the work. This arrangement has the defect that for a given minimum diameter of work the diameter of the cutter indexing wheel nearest the work indexing wheel is limited by the necessity of making the cutter indexing wheel sufficiently small to prevent it fouling the spindle carrying the work indexing wheel; and the diameter of the helical guide is also limited according to the diameter of the cutter indexing wheel.

According to the present invention I arrange both cutter indexing wheels together with the helical guides on the side of the work farthest from the work indexing wheel and thereby avoid the necessity of using small cutter indexing wheels in machines arranged for cutting wheels or pinions of small diameter.

In the further description of this invention reference is made to the accompanying drawings in which Figure 1 is a plan of a machine to which this invention may be applied, and Fig. 2 is a sectional view showing in detail the part of the mechanism material to this invention.

These drawings illustrate mechanism which may be used for carrying out my invention in connection with a machine as described in my U. S. Patent No. 1,188,219, and in the drawings like parts are for convenience of reference indicated by like reference characters when they appear in both specifications.

In the drawing, 1 is a supporting frame carried by the bed 2, and 3 and 4 are bearings that are mounted on the frame to carry the rotatably mounted shaft or head spindle 5 on which is fixed the worm wheel or work indexing wheel 55. A mandrel or holder 6 extends from the spindle and passes through a chuck 8. The holder 6 is arranged to carry the wheel blank 9 which represents the work to be done.

The pinion shaped helical tooth cutters 11 and 12 are fixed to revoluble spindles 11' and 12' mounted respectively in adjustable brackets 26, 27 carried by a reciprocating carrier 19. The spindles 11' and 12' carry toothed pinions 20, 21 engaging correspondingly toothed spur wheels 22, 23 mounted respectively on sleeves $c$ and $a$ carried revolubly in suitable bearings 26', 27' fixed in brackets 26 and 27. The cutters 11 and 12 are disposed one on either side of the wheel blank or work 9. The cutter index worm wheels 30 and 31 are placed adjacent to each other and at the side of the machine farthest from the work indexing worm wheel 55. Worm wheels 30 and 31 are each made with extended bosses to form hollow cylinders within each of which is placed a nut or helical guide adapted to engage a corresponding screw. The worm wheel 31 is adapted to control the cutter 12 and worm wheel 30 to control cutter 11. In Fig. 1 and Fig. 2 the spur wheel 23 is mounted on a sleeve $a$ carried revolubly in bearings fixed in bracket 27 and is securely connected by means of a flange at one end with a helical guide screw $b$, which is adapted to engage the helical guide nut $f$ secured within the bore of the boss of worm wheel 31. The helical guide screw $b$ is made hollow in the form of a sleeve or shell. The spur wheel 22 is mounted on a sleeve $c$ carried revolubly in bearings fixed in bracket 26, and is securely connected with a shaft $e$ which passes clear through sleeve $a$ and hollow helical guide screw $b$ to helical guide screw $d$ to which it is securely keyed. The guide screw $d$ is adapted to engage the helical guide nut $g$, secured within the bore of the boss of indexing worm wheel 30.

Although the drawings illustrate the invention applied to a machine substantially as described in my U. S. Patent 1,188,219, it may also be applied to other machines of the same type, as for instance those described in U. S. Patents Nos. 579,708 and 1,103,851.

Having thus described the nature of my said invention and the best means I know of carrying the same into practical effect, I claim:—

1. In a machine for cutting double helical gear wheels, the combination of means for supporting and turning a wheel blank to be operated on with means for carrying and operating pinion shaped helical teeth cutters, the first said means comprising a rotatably mounted shaft, a holder for the blank carried by the shaft and a co-axial work indexing wheel secured to the shaft and located on one side of the blank, and the second said means comprising a reciprocating carrier, a pair of separate brackets supported on said carrier, a pair of spindles rotatably mounted one on each bracket, a pinion and a pinion shaped helical tooth cutter on each spindle, the two cutters being arranged one on each side of the blank, a pair of sleeves rotatably mounted one on each of said brackets, spur wheels fixedly mounted one on each sleeve and meshing respectively with said pinions, a pair of rotatably mounted cutter indexing wheels placed adjacent to one another and located both on the side of the work farthest from the said work indexing wheel, driving connections between the cutter indexing wheels and the said sleeves, and means for operating the cutter indexing wheels and work indexing wheel simultaneously, substantially as described.

2. In a machine for cutting double helical gear wheels, the combination of means for supporting and turning a wheel blank to be operated on with means for carrying and operating pinion shaped helical teeth cutters, the first said means comprising a rotatably mounted shaft, a holder for the blank carried by the shaft and a co-axial work indexing wheel secured to the shaft and located on one side of the blank and the second said means comprising a reciprocating carrier, a pair of separate brackets supported on said carrier, a pair of spindles rotatably mounted one on each bracket, a pinion and a pinion-shaped helical tooth cutter on each spindle, the two cutters being arranged one on each side of the blank, a pair of sleeves rotatably mounted one on each of said brackets, spur wheels fixedly mounted one on each sleeve and meshing respectively with said pinions, a pair of rotatably mounted cutter indexing wheels placed adjacent to one another and located both on the side of the work farthest from the said work indexing wheel, a driving connection between one of the cutter indexing wheels and one of the sleeves and a second driving connection between the other cutter indexing wheel and the other of the said sleeves, the latter driving connection being co-axial with first said driving connection, and means for operating the work indexing wheel and said cutter indexing wheels simultaneously, substantially as described.

3. In a machine for cutting double helical gear wheels, the combination of means for supporting and turning a wheel blank to be operated on with means for carrying and operating pinion-shaped helical teeth cutters, the first said means comprising a rotatably mounted shaft, a holder for the blank carried by the shaft and a co-axial work indexing wheel secured to the shaft and located on one side of the blank, and the second said means comprising a reciprocating carrier, a pair of separate brackets supported on said carrier, a pair of spindles rotatably mounted one on each bracket, a pinion, and a pinion-shaped helical tooth cutter carried one on each spindle, the two cutters being arranged one on each side of the blank, a pair of sleeves rotatably mounted one on each of said brackets, spur wheels fixedly mounted one on each sleeve and meshing respectively with said pinions, a pair of rotatably mounted cutter indexing wheels placed adjacent to one another in axial alinement and located both on the side of the work farthest from the said working wheel, but one nearer to the work than the other, the near and distant cutter indexing wheels each having a tubular boss, a driving connection between the near cutter indexing wheel, and one of the rotatably mounted sleeves, said driving connection including a hollow helical guide nut secured within the tubular boss of last said wheel, a hollow helical guide screw engaging the helical guide nut and secured to the last said sleeve, a second driving connection between the distant cutter indexing wheel and the second or other of the said sleeves, said driving connection including a hollow helical guide nut secured within the boss of the distant cutter indexing wheel, a second helical guide screw engaging the last said guide nut, and a shaft traversing the hollow helical guide screw and connected with the said second sleeve and the second helical guide screw, and means for operating the cutter indexing wheels and the work indexing wheel simultaneously, substantially as described.

In testimony whereof I have signed my name to this specification in the presence of two subscribing witnesses.

WILLIAM EDWIN SYKES.

Witnesses:
  CHARLES STANLEY HOPKINS,
  HENRY C. CARPENTER.